United States Patent
Winters et al.

(10) Patent No.: US 10,232,295 B2
(45) Date of Patent: Mar. 19, 2019

(54) FILTER INCLUDING SUPPORT FRAME

(71) Applicant: Filtration Group LLC, Joliet, IL (US)

(72) Inventors: Philip Winters, Lockport, IL (US);
Kevin Hobbs, Minooka, IL (US);
David Heritage, Plainfield, IL (US)

(73) Assignee: Filtration Group LLC, Joliet, IL (US)

(*) Notice: Subject to any disclaimer, the term of this patent is extended or adjusted under 35 U.S.C. 154(b) by 201 days.

(21) Appl. No.: 15/070,876

(22) Filed: Mar. 15, 2016

(65) Prior Publication Data

US 2017/0266597 A1    Sep. 21, 2017

(51) Int. Cl.
  *B01D 46/00*  (2006.01)
  *B01D 46/52*  (2006.01)
  *B01D 46/10*  (2006.01)

(52) U.S. Cl.
  CPC ......... *B01D 46/0005* (2013.01); *B01D 46/10* (2013.01); *B01D 46/521* (2013.01)

(58) Field of Classification Search
  CPC ............... B01D 46/00; B01D 46/0005; B01D 46/0009; B01D 46/10; B01D 46/521
  USPC .......................................... 55/495, 497, 501
  See application file for complete search history.

(56) References Cited

U.S. PATENT DOCUMENTS

| | | |
|---|---|---|
| 3,992,173 A | 11/1976 | Wharton et al. |
| 6,398,839 B2 | 6/2002 | Choi et al. |
| 6,521,011 B1 | 2/2003 | Sundet et al. |
| 6,843,820 B2 | 1/2005 | Kubokawa |
| 6,875,250 B2 | 4/2005 | Terlson |
| 7,090,713 B2 | 8/2006 | Terlson |
| 7,156,891 B2 | 1/2007 | Winters et al. |
| 7,435,278 B2 | 10/2008 | Terlson |
| 8,231,700 B2 | 7/2012 | Sundet |
| 8,491,690 B2 | 7/2013 | Crabtree et al. |
| 8,500,839 B2 | 8/2013 | Crabtree et al. |
| 8,685,129 B2 | 4/2014 | Lise |
| 8,979,966 B2 | 3/2015 | Lise |
| 8,992,650 B2 | 3/2015 | Rahmathullah et al. |
| 2009/0183477 A1* | 7/2009 | Workman .......... B01D 46/0002 55/495 |

FOREIGN PATENT DOCUMENTS

WO    2015143326 A1    9/2015

* cited by examiner

*Primary Examiner* — T. Bennett McKenzie
(74) *Attorney, Agent, or Firm* — Stinson Leonard Street LLP

(57) ABSTRACT

A filter includes filter media and a mesh panel secured to a face of the filter media. The mesh panel has a perimeter edge margin and intersecting web members that extend from the perimeter edge margin across the panel. A web member can have an outer web portion with a larger minimum width than an inner web portion. The web members can define an outer flow opening with a smaller cross-sectional opening than an inner flow opening defined by the web members. The flow openings can be diamond shaped. The web members can include one set of web portions that define an outer flow opening and another set that define an inner flow opening. The sum of the widths of the second set can be less than the sum of the widths of the first set.

16 Claims, 6 Drawing Sheets

US 10,232,295 B2

FILTER INCLUDING SUPPORT FRAME

FIELD

The present disclosure generally relates to a filter including a support frame.

BACKGROUND

Filters are commonly used in heating, ventilating, and/or air conditioning systems ("HVAC systems"), among other applications. Such filters include one or more sheets of filter media and a support frame supporting the filter media. For example, the filter media may be accordion folded to define pleats. Other types of filter media are non-pleated. In typical filtration systems, air or another fluid is forced through the filter media from an inlet face through an exhaust face. Suitable supports or webs of the support frame often extend across a portion of the inlet and/or exhaust faces of the filter, where they can obstruct flow through the filter.

SUMMARY

In one aspect, a filter includes filter media and a mesh panel secured to a face of the filter media. The mesh panel has a perimeter edge margin and first web members and intersecting second web members that extend across the panel from ends that intersect the perimeter edge margin. At least one of the first web members has an outer web portion and an inner web portion, each of which has a minimum width. The minimum width of the inner web portion is less than the minimum width of the outer web portion.

In another aspect, a filter includes filter media and a mesh panel secured to a face of the filter media. The mesh panel has a perimeter edge margin and first web members and intersecting second web members that extend across the panel from ends that intersect the perimeter edge margin. The first and second web members define an outer flow opening and an inner flow opening, each of which has a cross-sectional area. The cross-sectional area of the inner flow opening is greater than the cross-sectional area of the outer flow opening.

In another aspect, a filter includes filter media and a mesh panel secured to a face of the filter media. The mesh panel has a perimeter edge margin and first and second sets of web portions defining generally diamond-shaped flow openings, each of which has a cross-sectional area. The second flow opening is disposed inward of the first flow opening relative to the perimeter edge margin and has a larger cross-sectional area than the first flow opening.

In another aspect, a filter includes filter media and a mesh panel secured to a face of the filter media. The mesh panel has a perimeter edge margin and first and second sets of web portions defining generally diamond-shaped flow openings. Each of the web portions has a length and a width. The second set of web portions is disposed inward of the first set of web portions with respect to the perimeter edge margin and the sum of the widths of the second set of web portions is less than the sum of the widths of the first set of web portions.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
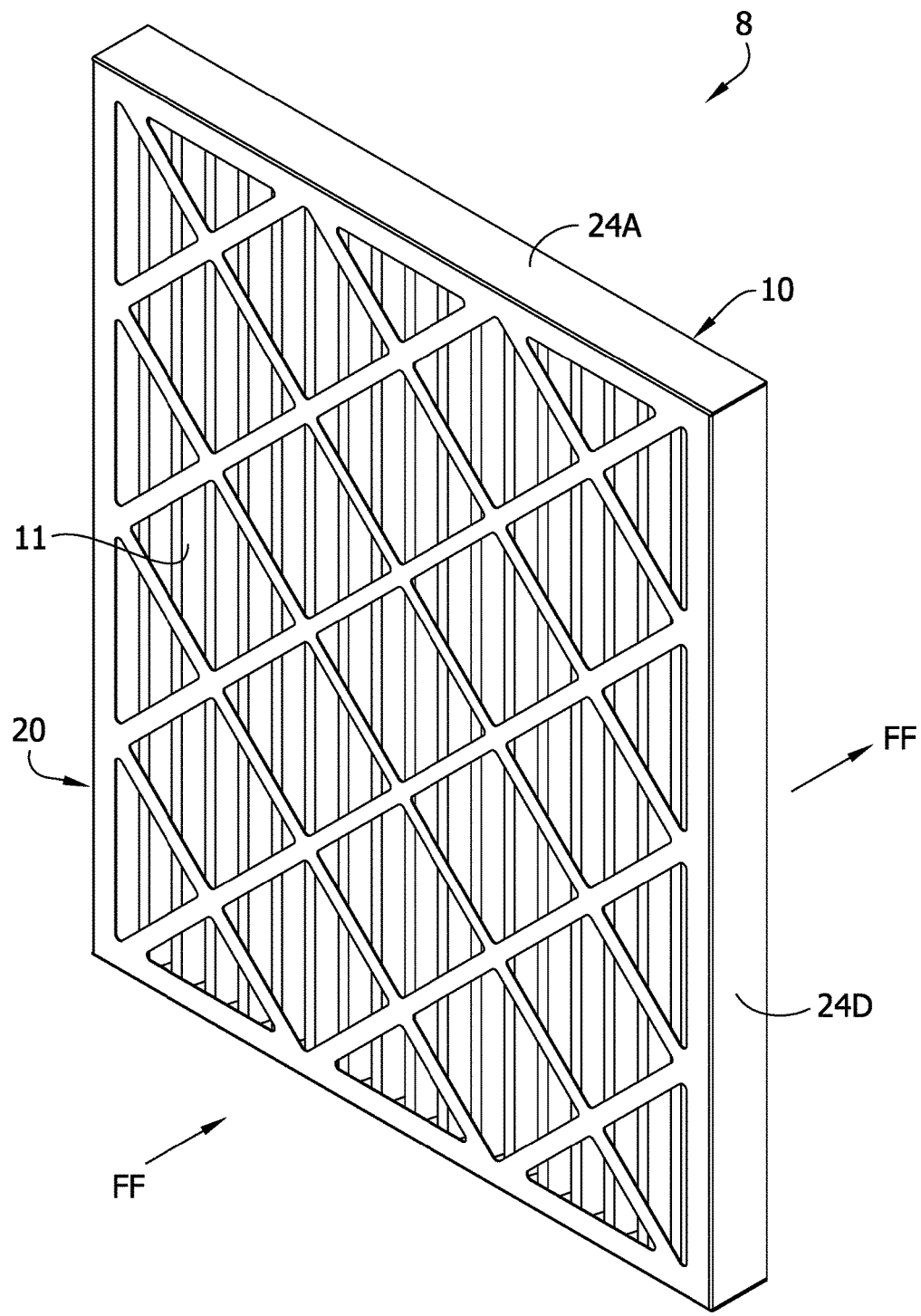
FIG. 1 is a perspective of a filter constructed according to the teachings of the following description.
Figure 2:
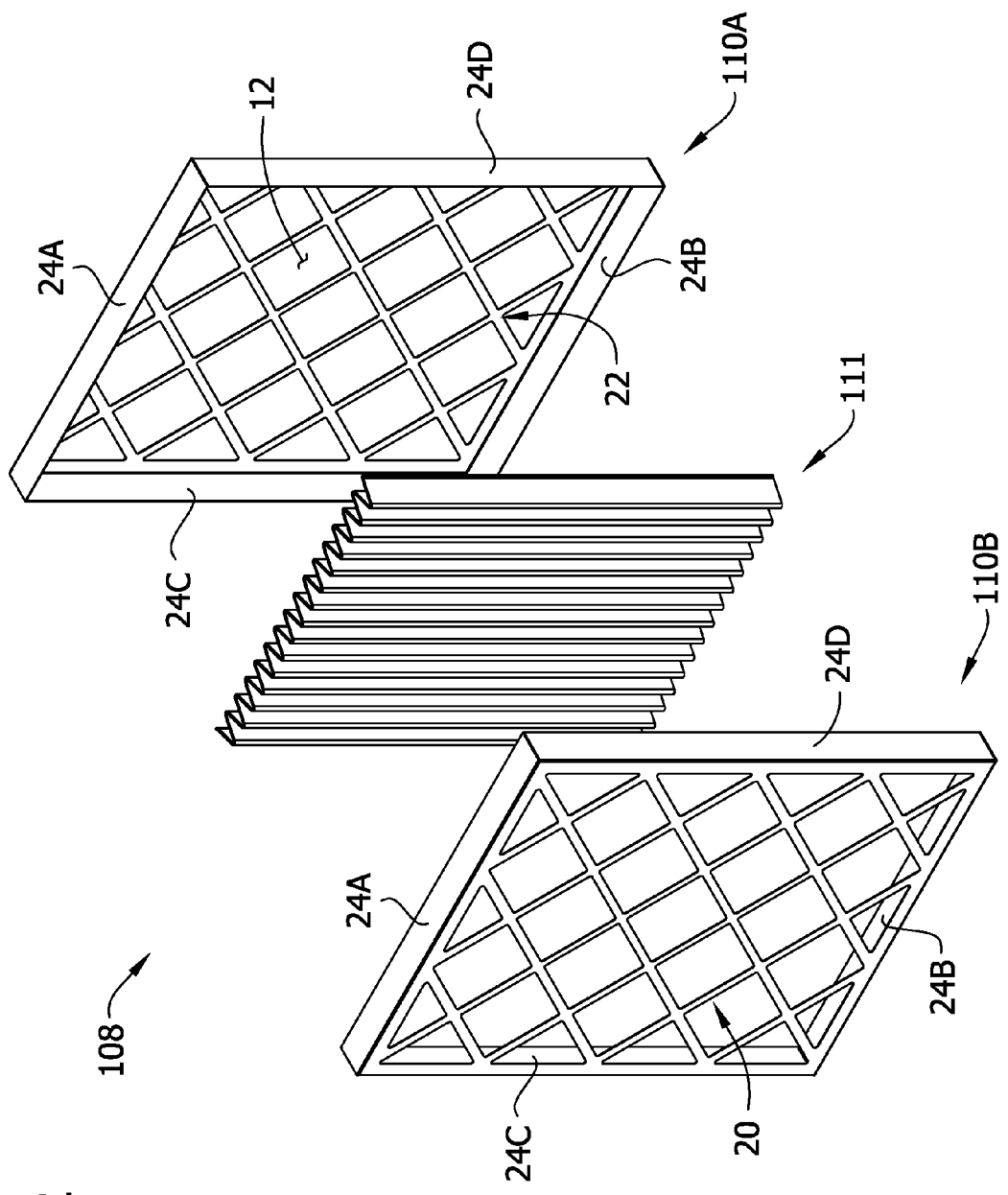
FIG. 2 is an exploded perspective of a filter.

Referring to FIGS. 1 and 2, one embodiment of a filter is generally indicated at 8. The filter 8 comprises a support frame, generally indicated at 10, and one or more sheets of filter media 11 supported by the support frame. In the illustrated embodiment, the filter media 11 is accordion folded to define pleats. In other embodiments, the filter media 11 may be planar (e.g., non-pleated) or constructed in other ways. The filter media 11 has an upper end, a lower end, and opposite sides that define a perimeter of the filter media. As used herein, the terms that denote locations of components and structures relative to other components and structures, including but not limited to "upper," "lower," "left," and "right," are based on the orientation of the filter 8 shown in FIG. 1. It is understood filter 8 may be in other orientations during use. The filter media 11 also has an inlet face and an exhaust face. As used herein, the term "inlet" and "exhaust" when describing the filter 8 and components thereof relate to fluid flow through the filter in use. The pleats of the illustrated filter media 11 are arranged so that the surface area of the inlet face and the exhaust face of the filter media is larger than the cross-sectional area of the perimeter of the filter media. As shown schematically by the arrows labeled FF in FIG. 1, the support frame 10 is configured to support the filter media 11 in a fluid handling system (e.g., an HVAC system) so that fluid flows through the filter 8 from the inlet face through the exhaust face of the media. As explained below, the support frame 10, constructed according to the principles of the present disclosure, is configured to maximize the fluid flow FF through the filter 8 while providing support to the filter media (e.g., maintaining the shape of the pleats).

Although the illustrated filter 10 is rectangular or square in shape, other shapes are possible. The filter media 11 may be formed from a relatively thin porous material that permits air to pass therethrough, while entrapping particular matter, such as dust, lint, allergens, etc. For example, suitable HVAC filter media may comprise a polyester fiber media, cellulosic fiber media or bi-component media including polyethylene and polypropylene fibers carried on a support structure such as a polyester scrim, fiberglass scrim or cellulosic scrim. For typical HVAC applications, the filter 8 may be about 12-30 inches by about 12-30 inches, with a depth of 0.7-4.38 inches.

As shown in FIG. 2, the support frame 10 comprises two pieces 10A, 10B that are secured together to form the support frame (e.g., using adhesives or other fasteners). The support frame 10 defines a cavity 12 that is sized and arranged for receiving the filter media 11. The support frame piece 10A includes an inlet mesh panel, generally indicated at 20. The support frame piece 10B includes an exhaust mesh panel, generally indicated at 22, spaced apart from and opposing the inlet mesh panel 20. Upper, lower, left and right perimeter walls, 24A, 24B, 24C, 24D, respectively, of the support frame 10 extend between and interconnect the inlet and outlet panels 20, 22 to define the cavity 12. As discussed in further detail below, the inlet mesh panel 20 and the exhaust mesh panel 22 are configured to allow the fluid FF to flow through the filter 8 along a flow path. When the filter media 11 is received in the cavity 12, the inlet mesh panel 20 supports the inlet face of the filter media, the exhaust mesh panel 22 supports the exhaust face of the filter media, and the perimeter walls 24A, 24B, 24C, 24D support the perimeter of the filter media. The inlet face (e.g., one or more pleats) of the filter media 11 may be secured, such as by adhesive or other ways, to the inlet mesh panel 20. The outlet face (e.g., one or more pleats) of the filter media 11 may be secured, such as by adhesive or other ways, to the outlet mesh panel 22. The perimeter of the filter media 11 may be secured, such as by adhesive or other ways, to the perimeter walls 24A, 24B, 24C, 24D of the support frame 10. Additional structures may be secured to the filter media 11 within the support frame 10 or the support frame may be the only support for the filter media received therein. In other embodiments, instead of a two-piece construction, the frame can be formed from a single piece of material that includes opposing mesh panels that are foldably interconnected along a hinge panel as is known in the art.

Figure 3:
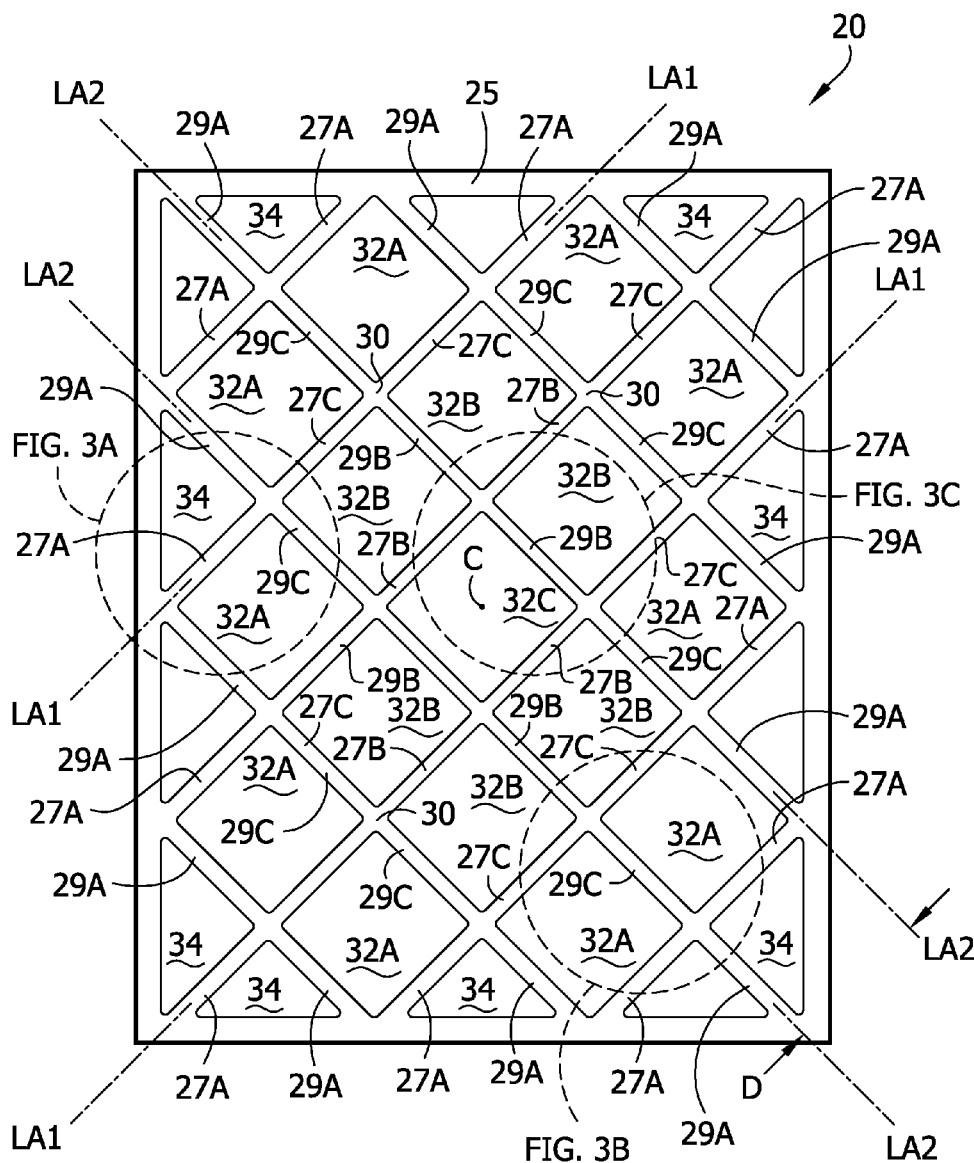
FIG. 3 is an elevation of an inlet mesh panel of the support frame.

Referring to FIG. 3, the inlet mesh panel 20 comprises a perimeter edge margin 25 having upper, lower, left, and right sections. A set of first web members, generally indicated at 27, have opposite longitudinal ends connected to the perimeter edge margin 25 and extend across the inlet face of the filter media 11 in a first direction. The first web members 27 are spaced apart from and generally parallel to one another. The first web members 27 have lengths extending generally diagonally, for example, as shown in FIG. 3, from a left side margin 25 of the mesh panel 20 toward a bottom end margin of the panel or from a top end margin of the mesh panel toward a right side margin of the panel. In the illustrated embodiment, the first web members 27 have central longitudinal axes LA1 uniformly spaced apart from one another. A set of second web members, generally indicated at 29, having opposite longitudinal ends connected to the perimeter edge margin 25 and extend across the inlet face of the filter media 11 in a second direction. The second web members 29 are spaced apart from and generally parallel to one another. The second web members 29 have lengths extending generally diagonally, for example, in a direction generally opposite that of the first web members 27. As shown in FIG. 3, the second web members 29 extend from a right side margin 25 of the mesh panel 20 toward the bottom end margin of the panel or from the top end margin of the mesh panel toward a left end margin of the panel. In the illustrated embodiment, the second web members 29 have central longitudinal axes LA2 uniformly spaced apart from one another. In the illustrated embodiment, the first web members 27 extend generally perpendicular to the second web members 29, although in other embodiments, the first and second web members may extend at other angles relative to one another.

Referring still to FIG. 3, each first web member 27 intersects at least one second web member 29, and each second web member intersects at least one first web member at nodes 30. In the illustrated embodiment, a plurality of the first web members intersect a plurality of the second web members at separate nodes 30. The inlet mesh panel 20 defines spaced apart rows of interior nodes 30, with the nodes in each row being spaced apart from one another, and the nodes in adjacent rows being offset from one another. The first and second web members 27, 29 (i.e., two first web members and two second web members) together define a plurality of flow openings 32A, 32B, 32C (e.g., diamond-shaped openings) extending through the mesh panel 20. Other flow openings 34 (e.g., triangular shaped openings) are defined by one first web member 27, one second web member 29, and the perimeter edge margin 25 of the mesh panel 20. It is understood that the flow openings 32, 34 may be of other shapes without departing from the scope of the present invention.

Figure 3A:
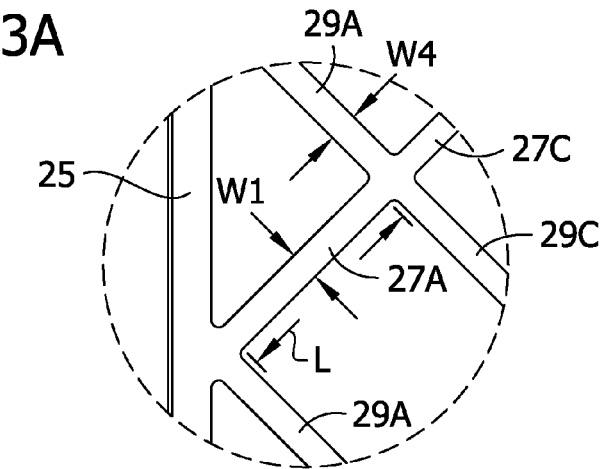
FIG. 3A is an enlarged view of a portion of FIG. 3 labeled 3A.
Figure 3B:
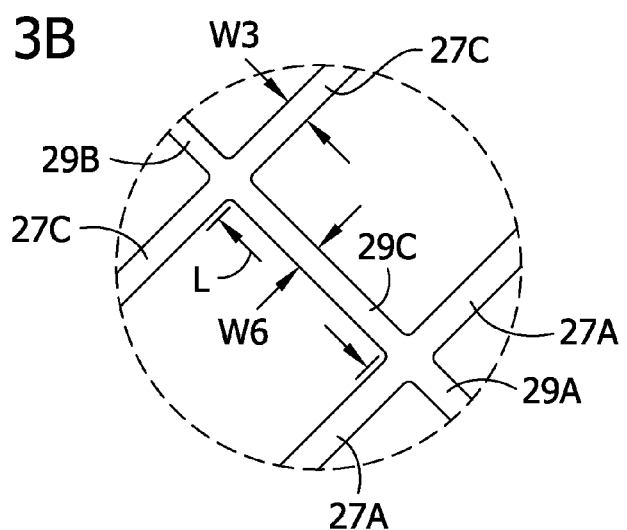
FIG. 3B is an enlarged view of a portion of FIG. 3 labeled 3B.
Figure 3C:
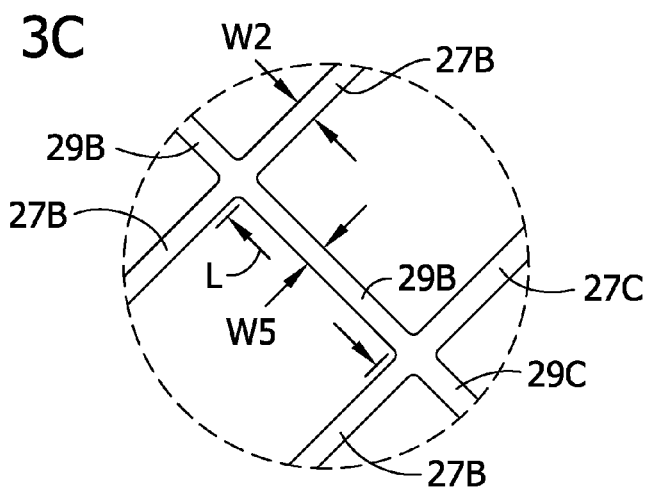
FIG. 3C is an enlarged view of a portion of FIG. 3 labeled 3C.

The first web members 27 each have a length, a width extending along the length, and a cross-sectional thickness. The first web members 27 include first web portions that are spaced apart from one another along the length of the corresponding first web member and extend between, but do not include, two adjacent nodes 30. In the illustrated embodiment, each first web member includes one or more of an outer web portion 27A, an inner web portion 27B, and an intermediate web portion 27C. As explained in more detail below, each outer web portion 27A has minimum width W1 (FIG. 3A) that is greater than minimum width W2 (FIG. 3C) of each inner web portion 27B. Each intermediate web portion 27C has a minimum width W3 (FIG. 3B) less than the minimum width W1 of each outer web portion and greater than the minimum width W2 of each inner web portion 27B.

The second web members 29 each have a length, a width extending along the length, and a cross-sectional thickness. The second web members 29 include second web portions that are spaced apart from one another along the length of the corresponding second web member and extend between, but do not include, two adjacent nodes 30. In the illustrated embodiment, each second web member includes one or more of an outer web portion 29A, an inner web portion 29B, and an intermediate web portion 29C. As explained in more detail below, each outer web portion 29A has minimum width W4 (FIG. 3A) that is greater than the minimum width W5 (FIG. 3C) of each inner web portion 29B. Each intermediate web portion 29C has a minimum width W6 (FIG. 3B) less than the minimum width W4 of each outer web portion and greater than the minimum width W5 of each inner web portion 29B. In the illustrated embodiment, the outer web portions 27A, 29A have equal widths W1, W4, the inner web portions 27B, 29B have substantially equal widths W2, W5, and the intermediate web portions 27C, 29C have substantially equal widths W3, W6.

Figure 4:
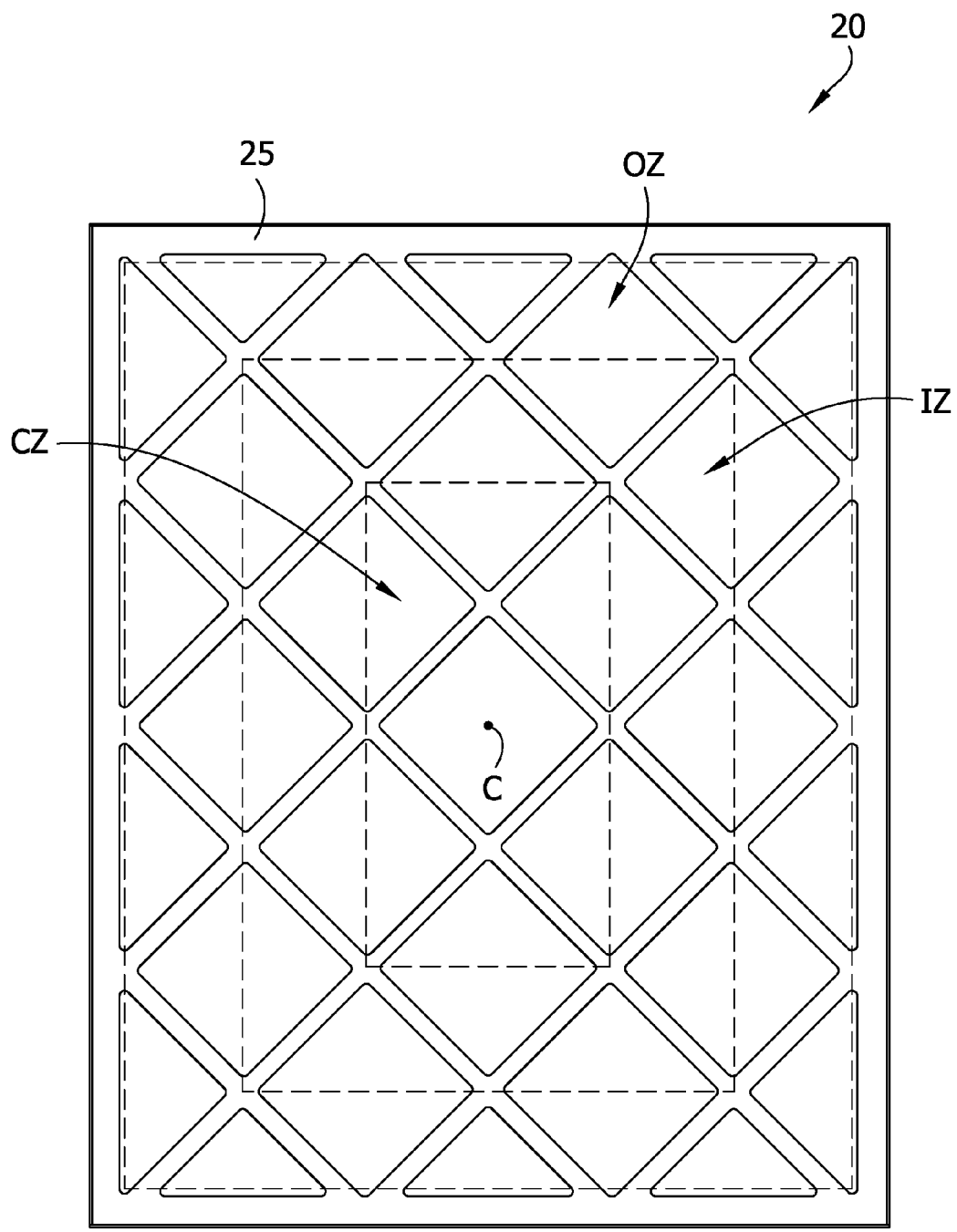
FIG. 4 is an elevation of the inlet mesh panel with relative zones of the inlet mesh panel being labeled.

In the illustrated embodiment, a set of the outer web portions 27A, 29A are adjacent the perimeter edge margin 25 of the mesh panel 20. For example, the set of the outer web portions 27A, 29A extends generally inward from the perimeter edge margin 25. As shown in FIG. 4, the set of the outer web portions 27A, 29A are disposed in an outer zone OZ adjacent the perimeter edge margin 25 and surrounding (and spaced apart from) the center C of mesh panel 20. A set of the inner web portions 27B, 29B are located inward of the outer web portions 27A, 29A relative to the perimeter edge margin 25. The set of inner web portions 27B, 29B are disposed in a central (or inner) zone CZ encompassing the center C of the mesh panel 20 and disposed inward of the outer zone OZ. The outer zone OZ surrounds the central zone CZ. In the illustrated embodiment, a set of the intermediate web portions 27C, 29C are disposed between adjacent sets of the inner and outer web portions 27A, 29A, 27B, 29B. The set of intermediate web portions 27C, 29C are disposed in an intermediate zone IZ surrounded by the outer zone OZ and surrounding the central zone CZ, such that the intermediate zone is inward of the outer zone and outward from the central zone relative to the perimeter edge margin 25 of the mesh panel 20. In the illustrated embodiment, the zones OZ, CZ, IZ are generally rectangular shaped, although the zones may be of other shapes. Although the illustrated grill 30 defines three zones, other embodiments can define only two zones (e.g., an outer zone and a central or inner zone) or more than three zones (e.g., an outer zone, an inner zone, and a plurality of intermediate zones).

According to the teachings of the present disclosure, it is believed the inlet mesh panel 20 should have the most structural support adjacent the perimeter edge margin 25 in order to maintain the function of the mesh panel. Accordingly, structural support adjacent the center C of the mesh panel 20 is less important than adjacent the perimeter edge margin 25. Moreover, it is believed that in use the highest fluid (e.g., air) velocity, and therefore, the most likely area to experience the most air flow resistance, is adjacent the center C of the mesh panel 20. To this end, the outer web portions 27A, 29A in the outer zone OZ provide more structural support to the mesh panel 20 compared to the inner web portions 27B, 29B, albeit with more airflow resistance, by having minimum widths W1, W4 greater than the minimum widths W2, W5 of the inner web portions 27B, 29B. The inner web portions 27B, 27C in the central zone CZ provide less air flow resistance, albeit with less structural support, compared to the outer web portions 27A, 29A by having minimum widths W2, W5 less than the minimum widths of the outer web portions 27A, 29A. The same holds true for the intermediate web portions 27C, 29C, in that the widths W3, W6 provide more structural support than the inner web portions 27B, 29B, albeit with more airflow resistance, and less airflow resistance than the outer web portions 27A, 29B, albeit with less structural support. As can be seen, the locations of the web portions having different widths relative to the center C of the inlet mesh panel 20 provides an increasing airflow gradient from the perimeter edge margin 25 toward the center of the inlet mesh panel and an increasing structural support gradient from the center of the inlet mesh panel toward the perimeter edge margin.

In one or more embodiments, the widths W1, W4 of the outer web portions 27A, 29A may be from about 5% to about 200% greater than the widths W2, W5 of the inner web portions 27B, 29B (e.g., from about 7% to about 100% greater, from about 10% to about 50% greater, from about 12% to about 25% greater, or from about 14% to about 17% greater). In one example, the widths W1, W4 of the outer web portions 27A, 29A may be about ½ in (1.27 cm), and the widths W2, W5 of the inner web portions 27B, 29B may be about ⅜ in (0.9525 cm). In this same example, if present the widths W3, W6 of the intermediate web portions 27C, 29C may be about 7/16 in (1.11125 cm). It is understood that in other embodiments, the inlet mesh panel 20 may not include intermediate web portions having widths different than inner and outer web portions. In yet other embodiments, the inlet mesh panel may include more than one set of intermediate web portions.

Referring to FIG. 3, at least some of the first web members 27 and the second web members 29 include respective outer web portions 27A, 29A, and respective inner web portions 27B, 29B. As can be seen, some of the first web members 27 and the second web members 29 also include intermediate web portions 27C, 29C. Other web members 27, 29 include outer web portions 27A, 29A, and intermediate web portions 27C, 20C. Thus, at least some of the web members 27, 29 generally taper or narrow toward their respective midpoints. In the illustrated embodiment, each web portion 27A, 29A, 27B, 29B, 27C, 29C has a uniform or constant width along its corresponding length. These web members 27, 29 taper or narrow in a step-wise fashion based on the widths W1-W6 of the corresponding web portions 27A, 29A, 27B, 29B, 27C, 29C.

Figure 5:
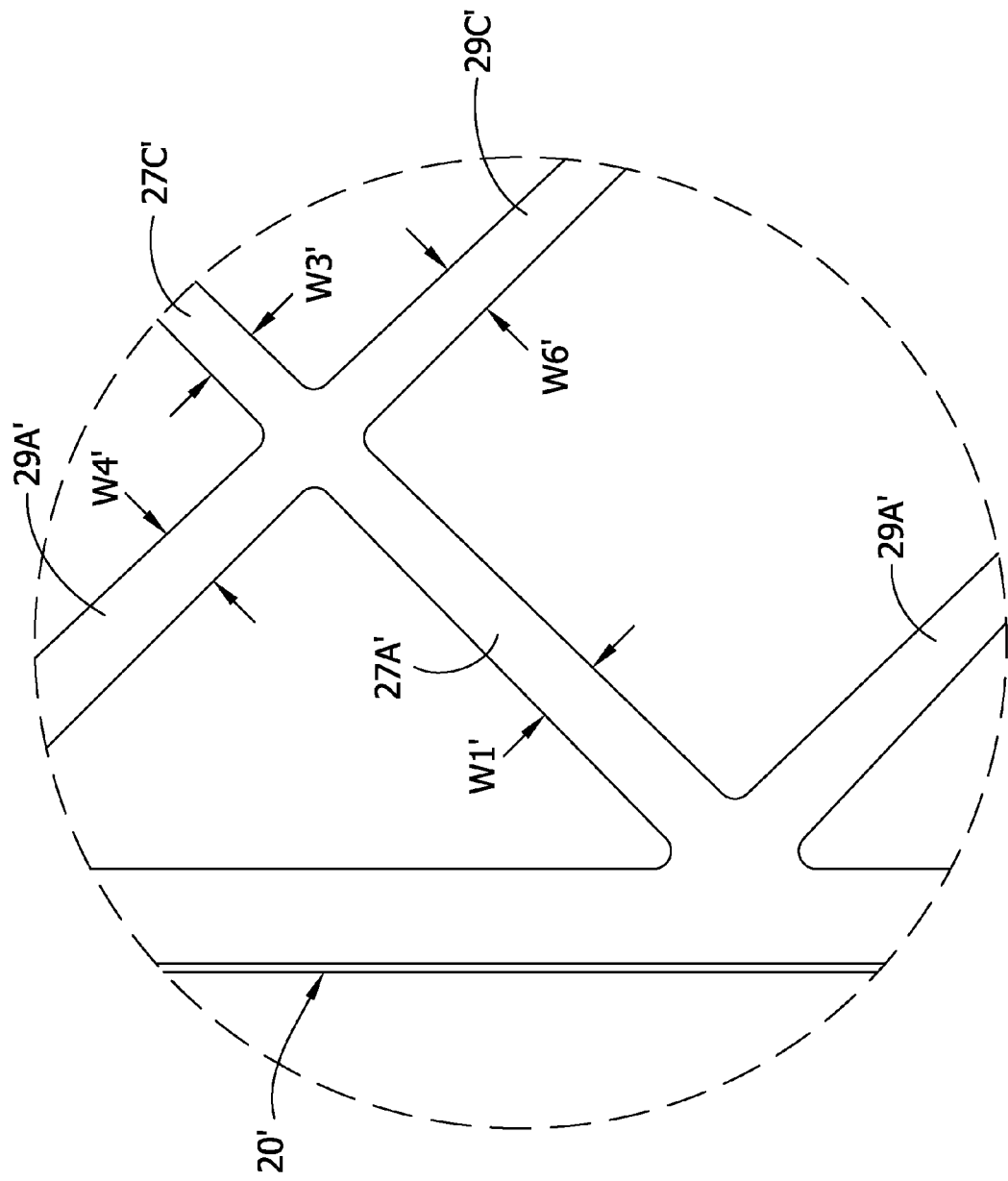
FIG. 5 is an enlarged view of a portion of a mesh panel of another support frame.

As shown in FIG. 5, each web member 27', 29' may also have a width that tapers gradually toward a midpoint of the corresponding web member, as opposed tapering in a step-wise manner. For example, outer web portions 27A', 29A' have respective widths W1', W4' that taper as the web portions extend inward toward the midpoint of their web members 27', 29' from their outboard ends, and intermediate web portions 27C', 29C' have respective widths W3', W6' that taper inward as they extend toward the mid points of their web members 27', 29' from their outboard ends. FIG. 5 illustrates only a portion of a mesh panel 20 in order to clearly show the gradual tapering of the web members 27, 29. Thus, only the outer web portions 27A', 29A,' intermediate web portions 27C', 29C', and their widths W1', W4' and W3', W6' are shown, but the mesh panel 20' further includes inner web portions (not shown) that taper inward as they extend toward the midpoints of their web members 27', 29'. At least some of the web portions 27A', 29A', 27C', 29C' (and inner web portions which are not shown) have a minimum width and a maximum width which are different from one another, unlike the embodiment illustrated in FIG. 3, in which the widths W1, W2, W3, W4, W5, W6 of each web portion 27A, 27B, 27C, 29A, 29B, 29C is uniform, making the uniform width the minimum width. The minimum width of the tapering inner web portions (not shown) will be less than the minimum width W1', W4' of the tapering outer web portions 27A', 29A'. And, if present, the minimum width W3', W4' of the tapering intermediate web portions 27C', 29C' will be less than the minimum width W1', W4' of the tapering outer web portions 27A', 29A' and greater than the minimum width of the tapering inner web portions (not shown).

Referring again to FIG. 3, as can be understood due to the difference in widths of the web portions, the cross-sectional areas of the flow openings increases toward the center C of the inlet mesh panel 20. In the illustrated embodiment, outer flow openings 32A are defined by two outer web portions 27A, 29A and two intermediate web portions 27C, 29C; intermediate flow openings 32B are defined by two intermediate web portions and two inner web portions 27B, 29B; and a central flow opening 32C (e.g., at least one central flow opening) is defined by four inner web portions 27B, 29B. Since the center longitudinal axes LA1, LA2 of adjacent web members 27, 29 in each of the are spaced apart from one another by a substantially equal distance D, the use of different ones of the webs portions 27A, 29A, 27B, 29B, 27C, 29C to define the flow openings 32A-32C results in the flow openings having different cross-sectional areas that increase toward the center C. The cross-sectional areas of the outer flow openings 32A are less than the cross-sectional areas of the inner flow openings 32C. The cross-sectional areas of the intermediate flow openings 32B are greater than the cross-sectional areas of the outer flow openings 32A and less than the cross-sectional areas of the central flow opening 32C. Accordingly, the flow openings 32A-32C are arranged in a gradient of an increasing cross-sectional area toward the center C.

For example, in suitable mesh panels, the cross-sectional area of each inner flow opening 32C can be from about 1% to about 25% greater than the cross-sectional area of each of the outer flow passages 32A (e.g., from about 1% to about 15%, from about 1% to about 10%, from about 1% to about 5%, or from about 1% to about 3%). As can be understood from FIG. 5, the percent open area of the central zone CZ is greater than the percent open area of the outer zone OZ. And the percent open area of the intermediate zone IZ is greater than the percent open area of the outer zone OZ and less than the percent open area of the central zone CZ.

As can also be understood, the first and second web members 27, 29 have sets of four intersecting web portions defining the generally diamond-shaped flow openings. For example, the outer diamond-shaped openings 32A adjacent the perimeter edge margin 25 are defined by two outer web portions 27A, 29A, and two intermediate web portions 27C, 29C. The sum of the widths of these web portions 27A, 29A, 27C, 29C equals a width sum. The diamond-shaped openings (e.g., intermediate openings 32B) disposed inward of the diamond-shaped openings adjacent the perimeter edge margin are defined by two intermediate web portions 27C, 29C and two inner web portions 27B, 29B. Accordingly, the sum of the widths of these web portions 27C, 29C, 27B, 29B equals a width sum that is less than the width sum of the web portions 27A, 29A, 27C, 29C defining the outward openings 32A. Moreover, these diamond shaped-openings 32B (and openings 32C) have a cross-sectional area that is greater than the cross-sectional area of the outward openings 32A.

As shown in FIG. 2, the exhaust mesh panel 22 is substantially identical to (e.g., a mirror image of) the inlet mesh panel 20. Accordingly, in this illustrated embodiment, it will be understood that the exhaust mesh panel 22 has the same features as the inlet mesh panel 20. In other embodiments, the exhaust mesh panel may be of other designs and/or constructions, including different features (e.g., a different arrangement of web members, web portions, and/or flow openings) from the inlet mesh panel 20. But preferably, the exhaust mesh panel 22 is similar, if not identical to the inlet mesh panel 20 to provide the advantage of increased airflow through the exhaust mesh panel.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A filter comprising:
a filter media having an inlet face and an opposite outlet face, the filter media configured to filter particulate matter from fluid flowing through the filter media; and
a mesh panel secured to the filter media and generally opposing at least one of the inlet face and the outlet face of the filter media, wherein the mesh panel includes
a perimeter edge margin adjacent a perimeter of the filter media,
first web members extending across said at least one of the inlet face and the outlet face of the filter media and having opposite longitudinal ends connected to the perimeter edge margin of the mesh panel, and
second web members extending across said at least one of the inlet face and the outlet face of the filter media and having opposite longitudinal ends connected to the perimeter edge margin of the mesh panel, wherein the second web members intersect the first web members at nodes,
wherein at least one first web member includes an outer web portion extending from the perimeter edge margin of the mesh panel along the length of the first web member to an adjacent node, the outer web portion having a minimum width,
wherein said at least one first web member further includes an inner web portion extending along the length of the first web member between adjacent nodes inward of the outer web portion relative to the perimeter edge margin of the mesh panel, the inner web portion having a minimum width,
wherein the minimum width of the inner web portion is less than the minimum width of the outer web portion.

2. The filter set forth in claim 1, wherein at least one second web member includes an outer web portion extending from the perimeter edge margin of the mesh panel along the length of the second web member to an adjacent node, the outer web portion of the second web member having a minimum width,
wherein said at least one second web member further includes an inner web portion extending along the length of the second web member between adjacent nodes inward of the outer web portion of the second web member relative to the perimeter edge margin of the mesh panel, the inner web portion having a minimum width,
wherein the minimum width of the inner web portion of the second web member is less than the minimum width of the outer web portion of the second web member.

3. The filter set forth in claim 2, wherein said at least one second web member intersects said at least one first web member at one of the nodes.

4. The filter set forth in claim 2, wherein a plurality of the first web members each include the outer web portion and the inner web portion of the first web member, wherein a plurality of the second web members each include the outer web portion and the inner web portion of the second web member.

5. The filter set forth in claim 2, wherein the inner web portions of the first and second web members have equal minimum widths, wherein the outer web portions of the first and second web members have equal minimum widths.

6. The filter set forth in claim 2, wherein the inner web portions of the first and second web members are disposed in an inner zone of the mesh panel, wherein the outer web portions of the first and second web members are disposed in an outer zone of the mesh panel, the outer zone surrounding the inner zone.

7. The filter set forth in claim 1, wherein a plurality of the first web members each include the outer web portion and the inner web portion.

8. The filter set forth in claim 1, wherein the mesh panel comprises an inlet mesh panel generally opposing the inlet face of the filter.

9. The filter set forth in claim 8, wherein the mesh panel further comprises an exhaust mesh panel generally opposing the outlet face of the filter.

10. The filter set forth in claim 1, wherein the intersecting first and second web members define at least one outer flow opening having a cross-sectional area, and at least one inner flow opening having a cross-sectional area, wherein the inner flow opening is disposed inward of the outer flow opening relative to the perimeter edge margin of the mesh panel, wherein the cross-sectional area of the inner flow opening is greater than the cross-sectional area of the outer flow opening.

11. The filter set forth in claim 10, wherein the inner flow opening is at least partially defined by the inner web portion of the first web member.

12. The filter set forth in claim 11, wherein the outer flow opening is at least partially defined by the outer web portion of the first web member.

13. The filter set forth in claim 12, wherein the outer flow opening includes a plurality of outer flow openings, wherein in the inner flow opening includes a plurality of inner flow openings.

14. The filter set forth in claim 13, wherein the inner and outer flow openings are generally diamond-shaped.

15. The filter set forth in claim 1, wherein the minimum width of the inner web portion extends along an entire length of the inner web extending between, but not including the adjacent nodes, wherein the minimum width of the outer web portion extends along an entire length of the outer web extending between, but not including, the adjacent node and the perimeter edge margin of the mesh panel.

16. The filter set forth in claim 1, wherein said at least one first web member further includes an intermediate web portion extending along the length of the first web member between adjacent nodes and disposed intermediate of the outer web portion and the inner web portion along the length of the first web member, the intermediate web portion having a minimum width that is less than the minimum width of the inner web portion and greater than the minimum width of the inner web portion.

* * * * *